J. F. JONES.
BUDDING TOOL.
APPLICATION FILED AUG. 29, 1910.

1,016,831.

Patented Feb. 6, 1912.

Witnesses
N. H. Lybrand
C. A. Bradley

Inventor
John F. Jones
By Victor J. Evans
Attorney

COLUMBIA PLANOGRAPH CO., WASHINGTON, D. C.

UNITED STATES PATENT OFFICE.

JOHN F. JONES, OF JEANERETTE, LOUISIANA.

BUDDING-TOOL.

1,016,831.   Specification of Letters Patent.   Patented Feb. 6, 1912.

Application filed August 29, 1910. Serial No. 579,389.

*To all whom it may concern:*

Be it known that I, JOHN F. JONES, a citizen of the United States, residing at Jeanerette, in the parish of Iberia and State of Louisiana, have invented new and useful Improvements in Budding-Tools, of which the following is a specification.

This invention relates to a tool designed especially for use in budding pecan, walnut and other trees that are difficult to propagate.

The principal object of the invention is the provision of an extremely simple, durable and practical tool by which the stock can be easily and quickly prepared for receiving the bud scion, the tool being so shaped that the cut made in the stock will correspond exactly to the bud scion so that the latter can be fitted in the cut with the cells of both opposite each other for insuring effective and rapid healing.

With such and other objects in view, the invention comprises the various novel features of construction and arrangement of parts which will be more fully described and set forth with particularity in the claims appended hereto.

Figure 1:
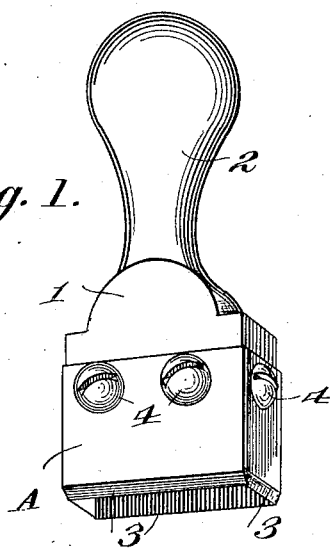
Figure 2:
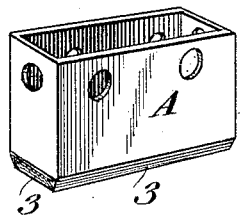
Figure 3:
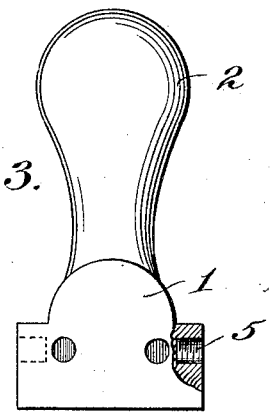

In the accompanying drawing, which illustrates one embodiment of the invention, Figure 1 is a perspective view of the tool. Fig. 2 is a perspective view of the cutter. Fig. 3 is a side view of the handle or stock.

Similar reference characters are employed to designate corresponding parts throughout the views.

Referring to the drawing, 1 designates the stock of the tool which is preferably, although not necessarily, an aluminum casting, and formed on the stock is a grip or handle 2. Applied to the stock is a cutter A which, in the present instance, is four-sided and hollow. This cutter may be formed from tube material and is preferably rectangular in cross section so that a relatively long and narrow piece can be removed from the stock that is to be budded and a correspondingly-shaped bud placed in the opening left in the stock. The bottom edge of each side of the cutter is beveled and sharpened at 3 so that the cutter will have a continuous rectangular cutting edge. The handle stock 1 enters the upper open end of the cutter and the latter is fastened in place by screws 4 passing through openings in the sides of the cutter and engaging in threaded openings 5 in the handle stock.

In using the tool, the cutting edge of the cutter is placed against the root stock to be budded, the long dimension of the cutter being vertical. The tool is then rocked in a horizontal plane on the curved surface of the root stock so that a rectangular incision will be made in the latter. The part inclosed in this incision is then removed so as to leave an opening or recess in the skin or bark. A scion bud is cut out in the same manner by the same tool and consequently this bud and the base formed by the part that is removed with it will exactly fill the recess or opening in the root stock that is to be budded. The bud is now placed in the recess or opening of the root stock and the edges of the bud will meet the edges or walls of the recess or opening in the root stock. The bud can now be bound in place in any suitable manner so that the parts will heal. This method of budding has been found, by actual practice, to be extremely simple, expeditious and highly reliable.

Having thus described the invention, what I claim as new, is:—

A budding tool comprising a hollow cutter of box-like form having its peripheral edge sharpened and having a plurality of openings in its sides, a handle having a body portion shaped in proportion to snugly fit in the cutter, and a plurality of fastenings passing through the openings and extending into the body of the handle for detachably securing the cutter thereto.

In testimony whereof I affix my signature in presence of two witnesses.

JOHN F. JONES.

Witnesses:
PAUL N. CEYR,
F. J. DOMINGUES.

---

Copies of this patent may be obtained for five cents each, by addressing the "Commissioner of Patents, Washington, D. C."